US008680895B2

(12) United States Patent
Carpenter et al.

(10) Patent No.: US 8,680,895 B2
(45) Date of Patent: Mar. 25, 2014

(54) CONTROLLING POWER CHAIN WITH SAME CONTROLLER IN EITHER OF TWO DIFFERENT APPLICATIONS

(75) Inventors: Brian Ashley Carpenter, Cary, NC (US); Tetsuo Tateishi, Nagoya (JP)

(73) Assignee: Texas Instruments Incorporated, Dallas, TX (US)

(*) Notice: Subject to any disclaimer, the term of this patent is extended or adjusted under 35 U.S.C. 154(b) by 739 days.

(21) Appl. No.: 12/901,049

(22) Filed: Oct. 8, 2010

(65) Prior Publication Data

US 2012/0086479 A1  Apr. 12, 2012

(51) Int. Cl.
*H03K 3/00* (2006.01)

(52) U.S. Cl.
USPC .............. 327/109; 318/34; 327/100; 327/108

(58) Field of Classification Search
USPC .............................. 318/34; 327/100, 108, 109
See application file for complete search history.

(56) References Cited

U.S. PATENT DOCUMENTS

| | | | | |
|---|---|---|---|---|
| 7,629,778 | B2* | 12/2009 | Liu | 323/222 |
| 7,884,590 | B2* | 2/2011 | Liu | 323/282 |
| 7,898,236 | B2* | 3/2011 | Houston et al. | 323/284 |
| 8,508,203 | B2* | 8/2013 | Tang et al. | 323/282 |
| 2005/0151568 | A1* | 7/2005 | Honda et al. | 327/108 |
| 2006/0113657 | A1* | 6/2006 | Ejury | 257/691 |
| 2007/0258180 | A1* | 11/2007 | Honda et al. | 361/139 |
| 2008/0012542 | A1* | 1/2008 | Liu et al. | 323/271 |
| 2009/0179235 | A1* | 7/2009 | Shiraishi et al. | 257/288 |
| 2010/0001790 | A1* | 1/2010 | Hashimoto et al. | 327/566 |
| 2010/0033237 | A1* | 2/2010 | Liang et al. | 327/543 |
| 2010/0264889 | A1* | 10/2010 | Hu | 323/282 |
| 2011/0018593 | A1* | 1/2011 | Williams | 327/109 |
| 2011/0175538 | A1* | 7/2011 | Wang | 315/224 |
| 2011/0188218 | A1* | 8/2011 | Hsing et al. | 361/772 |
| 2011/0241644 | A1* | 10/2011 | Hashimoto et al. | 323/299 |
| 2012/0106760 | A1* | 5/2012 | Kim | 381/120 |

OTHER PUBLICATIONS

DrMOS Specifications, Nov. 2004, pp. 1-17, Revision 1.0, Intel Corporation.
FDMF8704V, High Efficiency / High Frequency FET plus Driver Multi-chip Module with Internal Voltage Regulator, Nov. 2007, pp. 1-11, Rev. G, Fairchild Semiconductor Corporation.
Miniaturization and Performance Improvements in Synchronous Buck DC/DC Applications Employing DrMOS Driver Plus FET Multi-Chip Modules Help Meet Energy Regulations, DN Europe, http://www.edn-europe.com/knowledgecenter/fairchild_0308/index.html, Mar. 1, 2008, pp. 1-3, Reed Business Information, Reed Elsevier Inc.

* cited by examiner

*Primary Examiner* — Kawing Chan
(74) *Attorney, Agent, or Firm* — William B. Kempler; Wade J. Brady, III; Frederick J. Telecky, Jr.

(57) ABSTRACT

A controller for controlling a power chain in an electronic device can be used in either of two different applications. The first application requires the controller to produce drive signals for driving discrete power MOSFETs within the power chain. The second application requires the controller to produce an output PWM signal to control an integrated circuit having power MOSFETs integrated with MOSFET drivers within the power chain. The controller generally includes a sensor that detects which of the two applications the controller is in. The controller also generally includes outputs that produce, when the controller is in the first application, the drive signals for driving the discrete power MOSFETs. But when the controller is in the second application, one of the outputs is used to produce the output PWM signal for controlling the integrated circuit.

20 Claims, 7 Drawing Sheets

CONTROLLING POWER CHAIN WITH SAME CONTROLLER IN EITHER OF TWO DIFFERENT APPLICATIONS

BACKGROUND OF THE INVENTION

Typically, an electronic device (e.g. notebook/desktop computers, cell phones, etc.) has a power controller or voltage regulator that controls one or more power chains, or powertrains, to provide a stable and efficient power supply for some of the device's electronic components (e.g. central processing units and graphic processing units, among other types of integrated circuits). The design of the power controller generally depends on the type of power chain application into which the controller is to be incorporated. Common power chain applications typically have one of two primary design types: a discrete power MOSFET design or an integrated Driver-MOSFET (DrMOS) design.

As the name implies, a circuit 100 using a typical discrete power MOSFET design generally includes one or more power chains 102, 104 and 106, each having a high-side discrete power MOSFET 108 and a low-side discrete power MOSFET 110 external to a power controller 112, as shown in a simplified example in FIG. 1. When operated by the power controller 112, the discrete power MOSFETs 108 and 110 function together (with an output inductor 114 and an output capacitor 116, among other components not shown for simplicity) to produce the desired electrical power at Vout1, Vout2-VoutN. In such an application, therefore, the power controller 112 generally has to produce one or more sets of coordinated pairs of driver signals (high-side MOSFET driver signals DH1, DH2-DHN and low-side MOSFET driver signals DL1, DL2-DLN, among other signals not shown for simplicity) for properly controlling the function of the high-side and low-side discrete power MOSFETs 108 and 110. The high-side and low-side MOSFET driver signals DH1, DH2-DHN and DL1, DL2-DLN are generally based on a pulse-width modulated (PWM) signal 118 (produced by a PWM generator 120 within the power controller 112), but are sufficiently powerful to drive the discrete power MOSFETs 108 and 110 at an appropriate rate.

On the other hand, a circuit 122 using a typical DrMOS design generally includes one or more power chains 124, 126 and 128, each having a DrMOS integrated circuit (IC) DrMOS1, DrMOS2 and DrMOSN connected to a power controller 130, as shown in a simplified example in FIG. 2. Some DrMOS ICs (e.g. DrMOS1, DrMOS2 and DrMOSN) are defined by the standard DrMOS specification, available from Intel Corporation. Other integrated driver-MOSFET designs, which do not comply with the Intel specification, are also available. The term "DrMOS" is, thus, used herein to cover cases where a MOSFET driver 132 is combined with high-side and low-side power MOSFETs 134 and 136 in a switching power stage external to an IC of the power controller 130. Each DrMOS IC DrMOS1, DrMOS2 and DrMOSN, thus, drives an output inductor 138 and an output capacitor 140, among other components (not shown), to produce the desired electrical power at Vout1, Vout2-VoutN. Instead of producing driver signal pairs for MOSFETs, therefore, the power controller 130 simply has to produce a PWM signal PWM1, PWM2 and PWMN for a "PWM Input" of each DrMOS IC DrMOS1, DrMOS2 and DrMOSN. Consequently, the power controller 130 in a DrMOS-based application can be simpler, smaller and cheaper than the power controller 112 (FIG. 1) in a discrete power MOSFET application. Additionally, integration of the MOSFET driver 132 with the high-side and low-side power MOSFETs 134 and 136 in a single IC (or IC package) can result in cost and size benefits for a DrMOS-based application compared to a discrete power MOSFET application.

There is a basic incompatibility between the power controllers used with discrete power MOSFETs and the power controllers used with DrMOS ICs. In particular, the MOSFET driver signals DH1, DH2-DHN and DL1, DL2-DLN (FIG. 1) produced by the discrete MOSFET power controller 112 cannot be used to drive the PWM Inputs of the DrMOS ICs. Additionally, the PWM signals PWM1, PWM2 and PWMN (FIG. 2) produced by the DrMOS power controller 130 cannot be used to drive the discrete power MOSFETs 108 and 110, even if the PWM signals PWM1, PWM2 and PWMN are split into inverted and non-inverted signals. This incompatibility is primarily due to anti cross conduction, timing and edge characteristics (among other distinctive attributes) of the MOSFET driver signals and the PWM signals that are essential for proper functioning in their respective intended application, but which render the MOSFET driver signals unsuitable for use in a DrMOS-based application and the PWM signals unsuitable for use in a discrete MOSFET application.

In spite of the general advantages of DrMOS-based applications over discrete power MOSFET applications, there has been a relatively slow adoption of the DrMOS standard by the designers and manufacturers of the electronic devices in which these power chain design types are used. As a result, the designers and manufacturers of the power controllers for use in these two design types have to produce at least two different power controllers (or families of power controllers), since the same power controller cannot be used in both types of applications, even though either design type could conceivably be used in the same electronic device. In other words, the designers and manufacturers of the power controllers must maintain availability of at least two SKUs (stock keeping units) for power controllers that are basically redundant in spite of being of incompatible designs. As is usually the case, however, larger numbers of SKUs generally lead to lower efficiencies in resource utilization and inventory management and, thus, higher costs for each SKU.

It is with respect to these and other background considerations that the present invention has evolved.

SUMMARY OF THE INVENTION

A controller incorporating an embodiment of the present invention can be used to control a power chain in an electronic device that incorporates either a discrete power MOSFET application or a DrMOS-based application. The controller manufacturer is, therefore, able to maintain fewer numbers of SKUs, thereby potentially leading to greater efficiencies in resource utilization and inventory management and lower costs for each SKU. The controller generally includes a sensor that detects an application signal indicating whether the controller is in an application requiring the controller to produce drive signals for driving discrete power MOSFETs or in an application requiring the controller to produce an output PWM signal to control an integrated circuit having power MOSFETs integrated with MOSFET drivers. A first output of the controller produces a first drive signal and is for connecting to a first power MOSFET when the controller is in the discrete power MOSFET application. The second output produces a second drive signal and is for connecting to a second power MOSFET when the controller is in the discrete power MOSFET application, but produces the output PWM signal and is for connecting to a PWM input of the integrated circuit when the controller is in the integrated MOSFET/driver application.

The present invention is also generally embodied in a method for controlling a power chain by a controller in an electronic device as follows: The controller determines whether it is in either an application requiring production of drive signals for driving discrete power MOSFETs within the power chain, or an application requiring production of an output PWM signal to control an integrated circuit having power MOSFETs integrated with MOSFET drivers within the power chain. Upon determining that it is in the discrete power MOSFET application, the controller produces a first drive signal at a first output to control a first discrete power MOSFET within the power chain and produces a second drive signal at a second output to control a second discrete power MOSFET within the power chain. On the other hand, upon determining that it is in the integrated MOSFET/driver application, the controller produces the output PWM signal at the second output of the controller to control the integrated circuit.

A more complete appreciation of the present disclosure and its scope, and the manner in which it achieves the above noted improvements, can be obtained by reference to the following detailed description of presently preferred embodiments taken in connection with the accompanying drawings, which are briefly summarized below, and the appended claims.

DETAILED DESCRIPTION OF THE INVENTION

Figure 1:
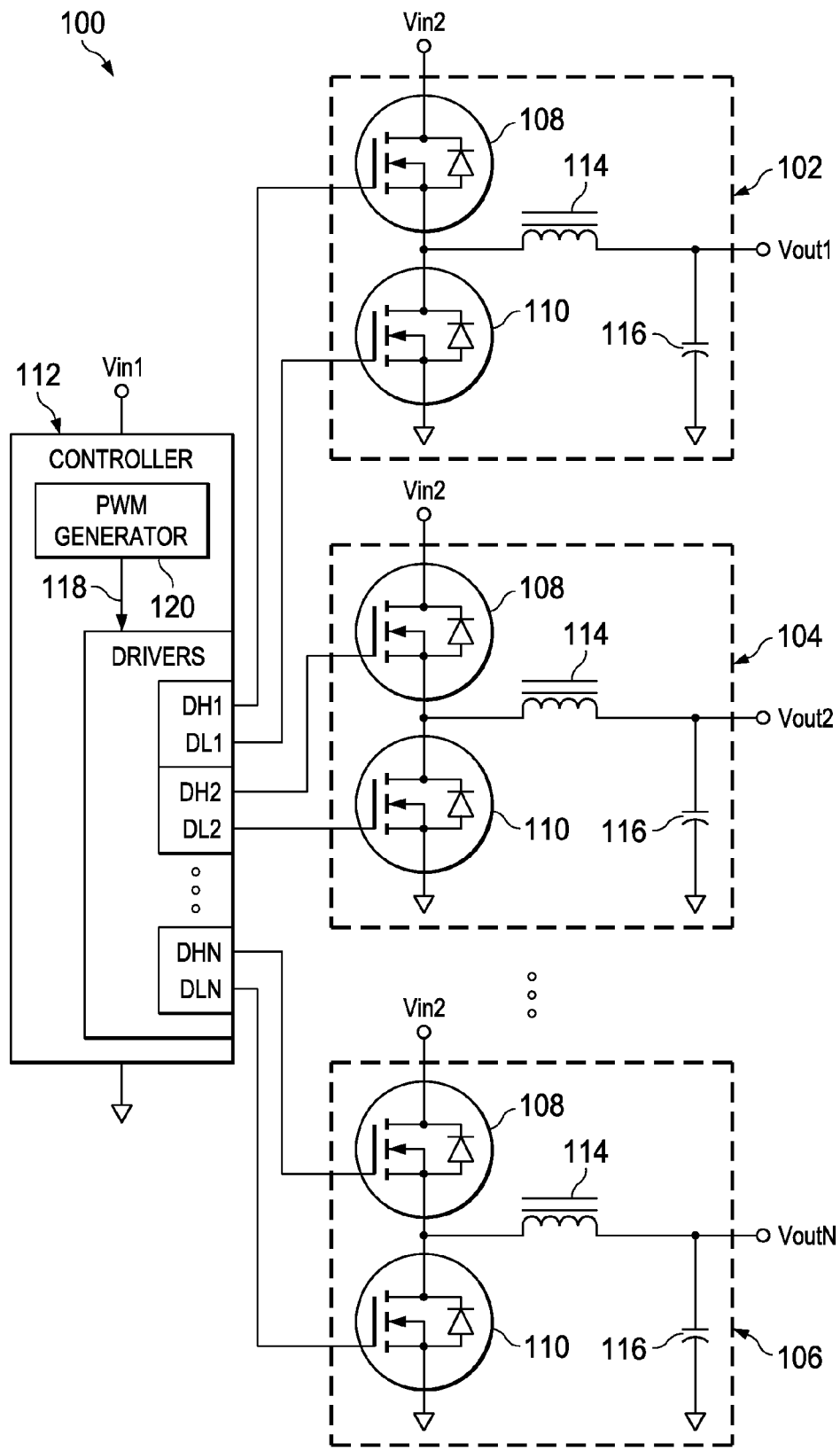
FIG. 1 is a simplified schematic diagram of a prior art combination of a power controller and discrete MOSFET power chains.
Figure 2:
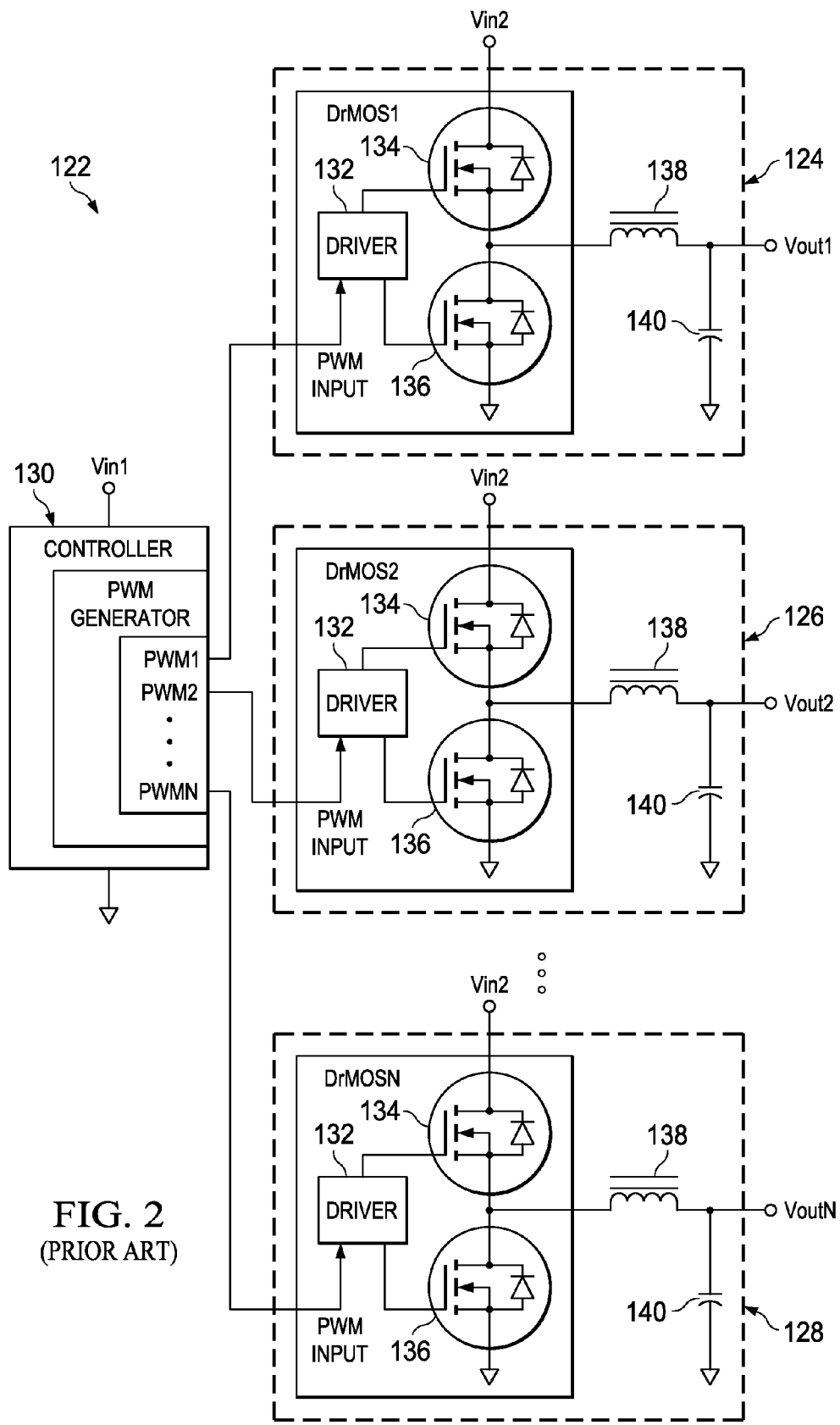
FIG. 2 is a simplified schematic diagram of a prior art combination of a power controller and DrMOS power chains.
Figure 3:
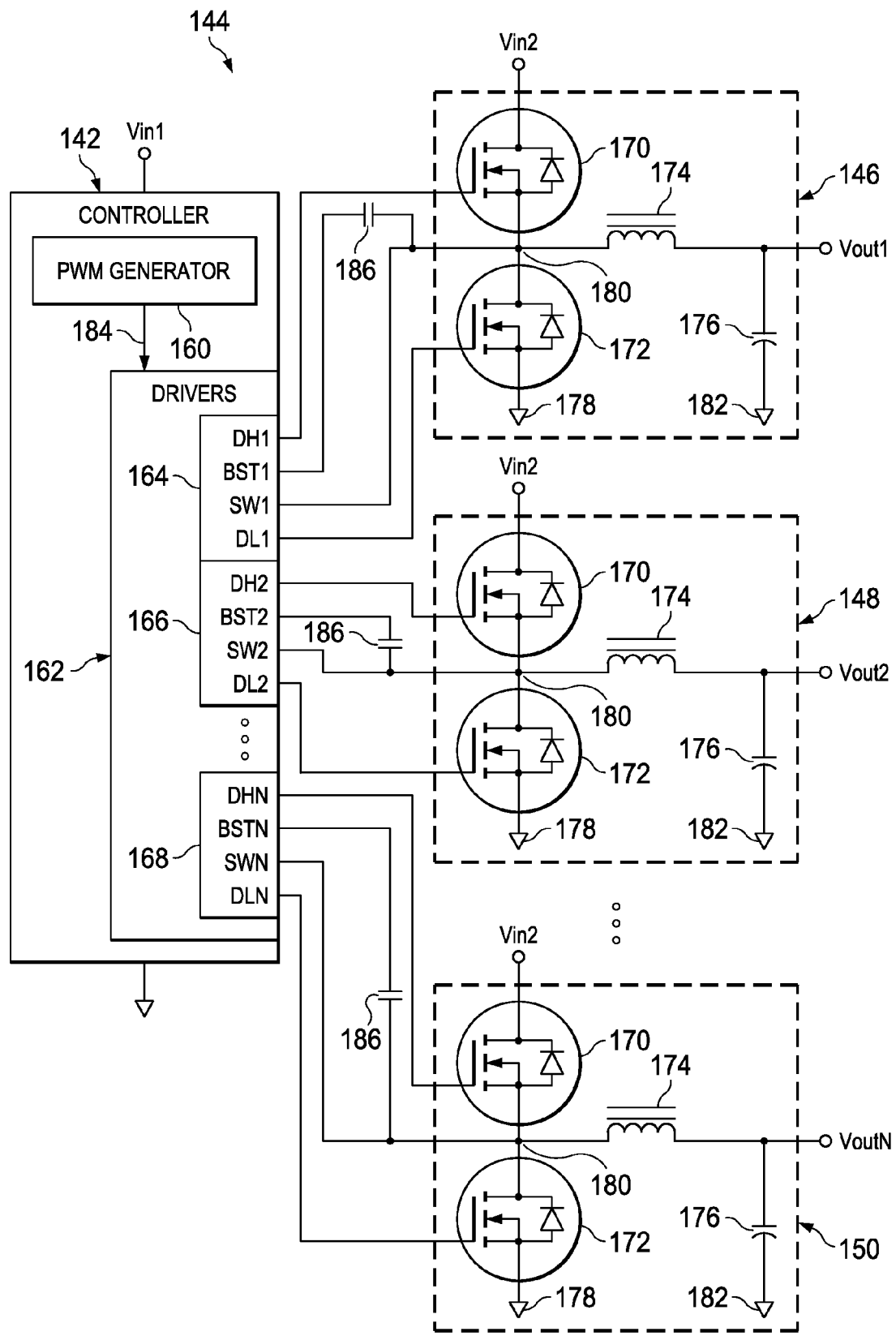
FIG. 3 is a simplified schematic diagram of a power controller, incorporating an embodiment of the present invention, with discrete MOSFET power chains connected thereto.
Figure 4:
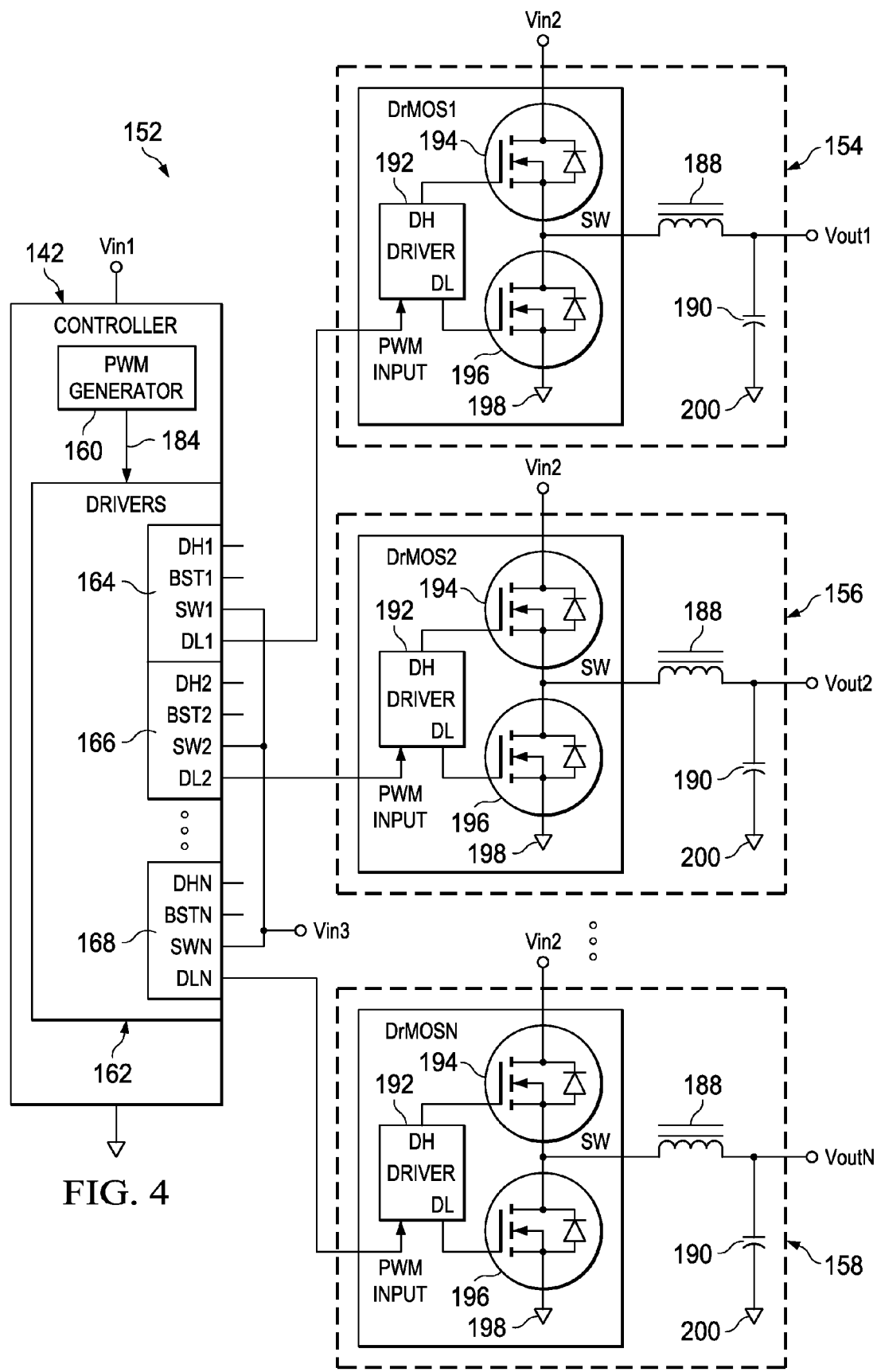
FIG. 4 is a simplified schematic diagram of the power controller shown in FIG. 3, but with DrMOS power chains connected thereto, according to an embodiment of the present invention.

A power controller, or voltage regulator, 142 incorporating an embodiment of the present invention may be used in a circuit 144 having one or more discrete power MOSFET power chains 146, 148 and 150 (as shown in FIG. 3) or in a circuit 152 having one or more DrMOS-based power chains 154, 156 and 158 (as shown in FIG. 4). Since the power controller 142 can be used in both of these design types, the potential market for the power controller 142 is much larger than for either of the prior art power controllers 112 (FIGS. 1) and 130 (FIG. 2), so greater economies of scale (e.g. manufacturing, distribution, etc.), greater efficiencies in resource utilization, lower numbers of SKUs and greater simplification of inventory management may be realized for the power controller 142 than for the prior art power controllers 112 and 130.

The arrangement of components depicted in FIGS. 3 and 4 (as well as in the prior art examples of FIGS. 1 and 2) is generally known as a step-down or "buck" topology. It is understood, however, that the present invention is not necessarily so limited. Instead, it is within the scope of the present invention that the concepts contained herein can be applied to other isolated or non-isolated power circuit topologies including resonant converters and other control techniques with appropriate modifications. The "buck" topology shown, therefore, is used herein for illustration purposes only and does not exclude other implementations or embodiments.

In the illustrated embodiments, the power controller 142 generally has a PWM generator 160 and drivers 162 having one or more output circuits 164, 166 and 168, among other components not shown for simplicity. As an IC, the power controller 142 includes several I/O pins (e.g. Vin1, ground, DH1, DH2-DHN, DL1, DL2-DLN, BST1, BST2-BSTN, SW1, SW2-SWN, among others not shown) at which the power controller 142 either produces signals for controlling the power chains 146-150 or 154-158 or receives power or control signals for controlling the functions of the power controller 142. At Vin1, for instance, the power controller 142 generally receives an input voltage (e.g. typically a 5V, 12V or other appropriate supply voltage) generated by an appropriate battery subsystem or power supply for powering components of the overall electronic device (e.g. a notebook/desktop computer, a cell phone, a video game system, an audio player, etc.) in which the power controller 142 is incorporated. Additionally, in a discrete power MOSFET application (e.g. FIG. 3), the I/O pins DH1-DHN, DL1-DLN, BST1-BSTN and SW1-SWN of the output circuits 164-168 are used to control power MOSFETs in the discrete power MOSFET power chains 146-150, as described below, similar to (though not necessarily exactly the same as) the manner in which the prior art discrete MOSFET power controller 112 (FIG. 1) operates. In a DrMOS-based application (e.g. FIG. 4), on the other hand, the functions of the I/O pins DH1-DHN, DL1-DLN, BST1-BSTN and SW1-SWN are different. In fact, as is described below, some of these I/O pins are preferably left open, i.e. not used. Additionally, in this application it is preferable to use one or more of these I/O pins to receive a signal indicating that the power controller 142 is in the DrMOS-based application, so the power controller 142 can be caused to alter its function accordingly, and to use one or more of the other I/O pins to generate a PWM signal to control the DrMOS-based power chains 154-158.

In a discrete MOSFET application, each power chain 146-150 (FIG. 3) generally includes a high-side discrete power MOSFET 170, a low-side discrete power MOSFET 172, an output inductor 174 and an output capacitor 176, among other components not shown for simplicity. The high- and low-side discrete power MOSFETs 170 and 172 are connected in series between an input voltage Vin2 and ground at 178. A high side of the output inductor 174 connects to a node 180 (commonly referred to as a switch node or phase node) between the high- and low-side discrete power MOSFETs 170 and 172. A low side of the output inductor 174 connects to the output capacitor 176, which is further connected to ground at 182. The output voltage Vout1, Vout2-VoutN for each power chain 146-150 is generally produced at a node between the output inductor 174 and the output capacitor 176.

Also, in a discrete power MOSFET application, each output circuit 164, 166 and 168 of the power controller 142 produces a high-side driver signal at DH1, DH2-DHN, a low-side driver signal at DL1, DL2-DLN, a bootstrap drive signal at BST1, BST2-BSTN and a switch node drive signal at SW1, SW2-SWN. Each high-side driver signal at DH1-DHN is connected to a gate of one of the high-side discrete power MOSFETs 170. Each low-side driver signal at DL1-DLN is connected to a gate of one of the low-side discrete power MOSFETs 172. Each switch node drive signal at SW1-SWN is connected to one of the switch nodes 180 between the high- and low-side discrete power MOSFETs 170 and 172. Each bootstrap drive signal at BST1-BSTN is connected through an external bootstrap capacitor 186 to one of the switch nodes 180.

Within each discrete power MOSFET power chain 146-150, the switch node drive signal at SW1-SWN connected to the switch node 180 serves as a reference voltage for the high-side discrete power MOSFET 170. The bootstrap drive signal at BST1-BSTN enables the high-side discrete power MOSFET 170 to function properly at power-up of the overall electronic device. The high- and low-side driver signals at DH1-DHN and DL1-DLN are generally enabled and disabled based on a PWM signal 184 produced by the PWM generator 160, with the high-side driver signal at DH1-DHN being approximately 180° out of phase with the low-side driver signal at DL1-DLN. In this manner, the switch node 180 is switched between being driven by the input voltage Vin2 (when the high-side discrete power MOSFET 170 is activated by the high-side driver signal at DH1-DHN) and being driven by the ground at 178 (when the low-side discrete power MOSFET 172 is activated by the low-side driver signal at DL1-DLN).

In a DrMOS-based application, each power chain 154-158 (FIG. 4) generally includes a DrMOS IC DrMOS1, DrMOS2 or DrMOSN, an output inductor 188 and an output capacitor 190, among other components not shown for simplicity. Each DrMOS IC DrMOS1-DrMOSN generally receives an input voltage Vin2 and a PWM signal (at PWM Input) and produces a switch node output (at SW), among other possible inputs and outputs. Additionally, each DrMOS IC DrMOS1-DrMOSN generally includes a MOSFET driver 192 integrated in an IC (or IC package) with a high-side power MOSFET 194 and a low-side power MOSFET 196, among other components.

The high- and low-side power MOSFETs 194 and 196 are connected in series between the input voltage Vin2 and ground at 198. The MOSFET driver 192 produces a high-side drive signal DH and a low-side drive signal DL (approximately 180 degrees out of phase with the high-side drive signal DH) based on the PWM signal received at the PWM Input. The high- and low-side drive signals DH and DL drive the high- and low-side power MOSFETs 194 and 196, respectively, to produce the switch node output (at SW) at a switch node between the high- and low-side power MOSFETs 194 and 196.

A high side of the output inductor 188 connects to the switch node output (at SW) of the DrMOS IC DrMOS1-DrMOSN. A low side of the output inductor 188 connects to the output capacitor 190, which is further connected to ground at 200. The output voltage Vout1, Vout2-VoutN for each DrMOS-based power chain 154-158 is generally produced at a node between the output inductor 188 and the output capacitor 190 based on the switch node output (at SW).

In a DrMOS-based application for the illustrated embodiment of the power controller 142 (e.g. FIG. 4), the high-side driver I/O pins DH1-DHN and the bootstrap drive I/O pins BST1-BSTN are preferably left open. The switch node drive I/O pins SW1-SWN are preferably connected to an appropriate input voltage Vin3. The low-side driver I/O pins DL1-DLN are connected to the PWM Input of the DrMOS ICs DrMOS1-DrMOSN. In the illustrated embodiment, the output signals provided by the low-side driver I/O pins DL1-DLN serve as the PWM signals for the PWM Inputs of the DrMOS ICs DrMOS1-DrMOSN. Tying the switch node drive I/O pins SW1-SWN to the input voltage Vin3 serves as a signal to the power controller 142 that the power controller 142 is in a DrMOS-based application, which preferably causes the power controller 142 to generate the PWM signals instead of the MOSFET driver signals. (In the discrete MOSFET application of FIG. 3, on the other hand, the absence of the input voltage Vin3 at the switch node drive I/O pins SW1-SWN serves as a signal to the power controller 142 that the power controller 142 is in the discrete MOSFET application, which preferably causes the power controller 142 to generate the MOSFET driver signals.)

It is understood that the present invention is not necessarily limited to embodiments having this particular I/O pin usage or configuration. Other embodiments may use different I/O pins to provide the PWM signals to the PWM inputs of the DrMOS ICs DrMOS1-DrMOSN. Some embodiments may include additional I/O pins not used for other purposes in the discrete MOSFET application. However, some space- and weight-saving advantages are achieved by reusing I/O pins for different purposes in the two applications. In the application that uses the most I/O pins (i.e. the discrete MOSFET application), therefore, there are no superfluous I/O pins.

Figure 5:
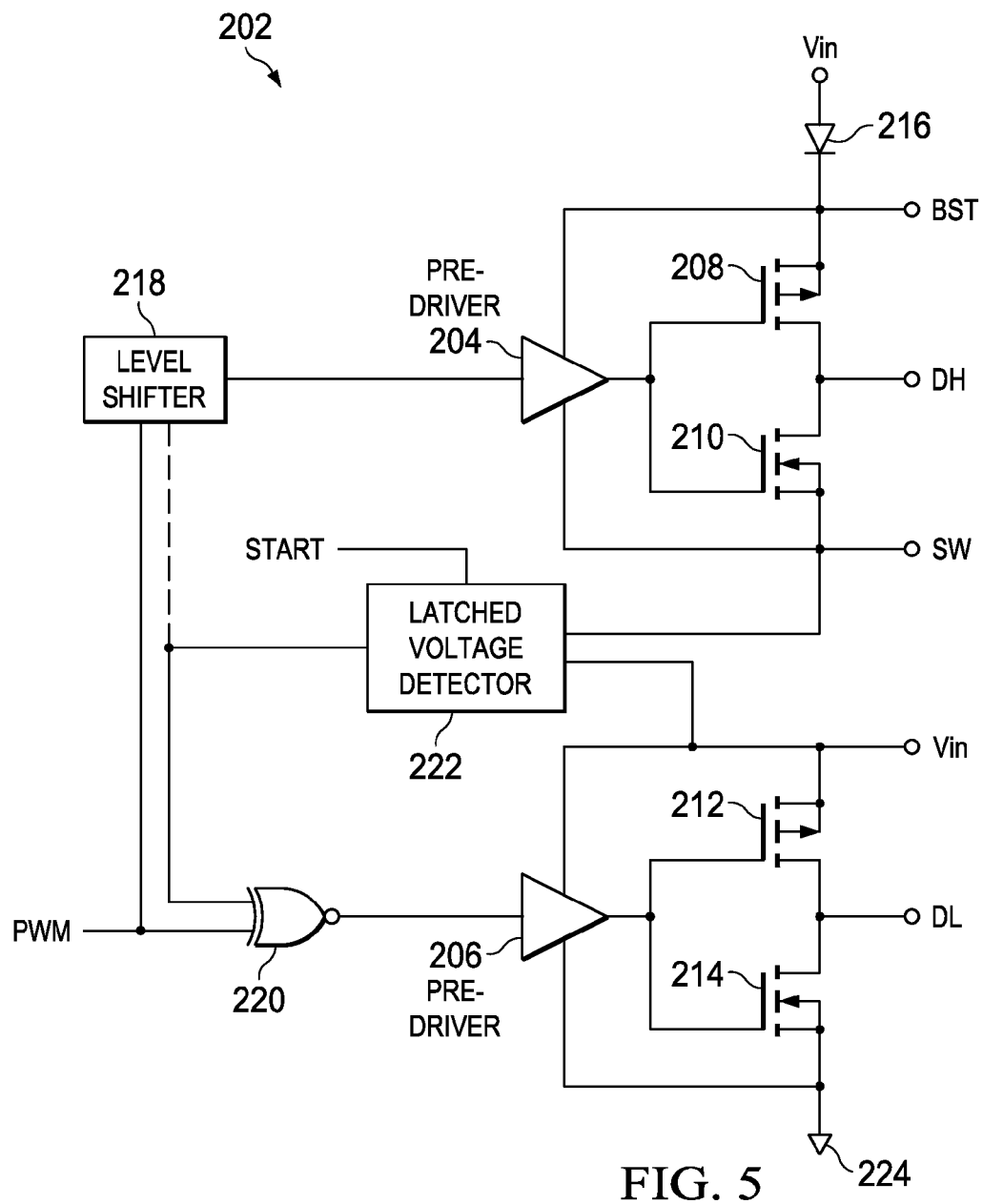
FIG. 5 is a simplified schematic diagram of an output circuit for use in the power controller shown in FIGS. 3 and 4, according to an embodiment of the present invention.

A first example for an embodiment for an output circuit 202 (e.g. the one or more output circuits 164, 166 and 168) that can be used in the drivers 162 of the power controller 142 is shown in FIG. 5. According to this embodiment, the output circuit 202 generally includes a high-side pre-driver 204, a low-side pre-driver 206, high-side P-channel and N-channel drive MOSFETs 208 and 210, low-side P-channel and N-channel drive MOSFETs 212 and 214, a diode 216, a level shifter 218, an XNOR gate 220 and a latched voltage detector 222. Also according to this embodiment, the output circuit 202 is generally connected to an appropriate input voltage Vin, ground at 224 and the PWM signal 184 (from the PWM generator 160, FIGS. 3 and 4) at "PWM". Furthermore, a switch node drive signal node SW generally connects to a corresponding one of the switch node drive I/O pins SW1-SWN (FIGS. 3 and 4). A bootstrap drive signal node BST generally connects to a corresponding one of the bootstrap drive I/O pins BST1-BSTN. A high-side MOSFET driver signal node DH generally connects to a corresponding one of the high-side driver I/O pins DH1-DHN. A low-side MOSFET driver signal node DL generally connects to a corresponding one of the low-side driver I/O pins DL1-DLN. Other components and connections may be included, but are not shown for simplicity.

The diode 216 and the high-side drive MOSFETs 208 and 210 are connected in series between the input voltage Vin and the switch node drive signal node SW as shown. The bootstrap drive signal node BST connects between the diode 216 and a source of the high-side P-channel drive MOSFET 208. The high-side MOSFET driver signal node DH connects between drains of the high-side drive MOSFETs 208 and 210. Gates of the high-side drive MOSFETs 208 and 210 are connected to an output of the high-side pre-driver 204. Also connected to the high-side pre-driver 204 are the bootstrap drive signal node BST, the switch node drive signal node SW and an output of the level shifter 218. An input of the level shifter 218 is preferably connected to the PWM signal at PWM. The level shifter 218 produces a level shifted PWM signal at its output based on the initial PWM signal at PWM.

The low-side drive MOSFETs 212 and 214 are connected in series between the input voltage Vin and the ground at 224 as shown. Additionally, the low-side MOSFET driver signal node DL connects between drains of the low-side drive MOSFETs 212 and 214. Gates of the low-side drive MOSFETs 212 and 214 are connected to an output of the low-side pre-driver 206. Also connected to the low-side pre-driver 206 are the input voltage Vin, the ground at 224 and an output of the XNOR gate 220. The latched voltage detector 222 is connected to the input voltage Vin and to the switch node drive signal node SW. The latched voltage detector 222 also preferably receives start signal at "Start". An output of the latched voltage detector 222 is connected to an input of the XNOR gate 220 and optionally to the level shifter 218. A second input of the XNOR gate 220 is preferably connected to the PWM signal at PWM.

In a discrete power MOSFET application (e.g. FIG. 3) incorporating the illustrated embodiment of FIG. 5, the switch node drive signal node SW is connected through the switch node drive I/O pin SW1-SWN of the power controller 142 to the switch node 180 between the discrete power MOSFETs 170 and 172. Therefore, since the bootstrap drive signal node BST is connected through the forward biased diode 216 to the input voltage Vin, there is a voltage potential between the bootstrap drive signal node BST and the switch node drive signal node SW. This voltage potential powers the high-side pre-driver 204 in this situation, so the high-side pre-driver 204 produces a high-side pre-drive signal, which is based on the level shifted PWM signal output from the level shifter 218. The high-side pre-drive signal is supplied to the gates of the high-side drive MOSFETs 208 and 210 to cause the high-side drive MOSFETs 208 and 210 to produce the high-side driver signal at the high-side MOSFET driver signal node DH. The high-side driver signal is, thus, supplied through the corresponding high-side driver I/O pin DH1-DHN of the power controller 142 to the high-side discrete power MOSFET 170 in this example situation.

On the other hand, in a DrMOS-based application (e.g. FIG. 4) incorporating the illustrated embodiment of FIG. 5, the switch node drive signal node SW is connected through the switch node drive I/O pin SW1-SWN of the power controller 142 to the input voltage Vin3. Therefore, since the bootstrap drive signal node BST is connected through the forward biased diode 216 to the input voltage Vin, there is almost no voltage potential (if the voltage level of Vin equals the voltage level of Vin3) between the bootstrap drive signal node BST and the switch node drive signal node SW. The high-side pre-driver 204 is, thus, effectively turned off, thereby conserving power. The high-side pre-driver 204, thus, does not produce the high-side pre-drive signal, so the high-side drive MOSFETs 208 and 210 do not produce the high-side driver signal at the high-side MOSFET driver signal node DH in this situation. Additionally, in an embodiment in which the output of the latched voltage detector 222 is supplied to the level shifter 218, the output of the latched voltage detector 222 is preferably used to disable the level shifter 218 for additional power-saving purposes in a DrMOS-based application.

In both a discrete power MOSFET application (e.g. FIG. 3) and a DrMOS-based application (e.g. FIG. 4) incorporating the illustrated embodiment of FIG. 5, the low-side pre-driver 206 is powered by a voltage potential between the input voltage Vin and the ground at 224. The low-side pre-driver 206 produces a low-side pre-drive signal based on a signal output from the XNOR gate 220. The low-side pre-drive signal is supplied to the gates of the low-side drive MOSFETs 212 and 214 to cause the low-side drive MOSFETs 212 and 214 to produce the low-side driver signal at the low-side MOSFET driver signal node DL.

In a discrete power MOSFET application (e.g. FIG. 3), the low-side driver signal is supplied through the corresponding low-side driver I/O pin DL1-DLN of the power controller 142 to the low-side discrete power MOSFET 172 in this example situation. On the other hand, in a DrMOS-based application (e.g. FIG. 4), the low-side driver signal is supplied through the corresponding low-side driver I/O pin DL1-DLN of the power controller 142 to the PWM Input of one of the DrMOS ICs DrMOS1-DrMOSN.

In a discrete power MOSFET application, the low-side driver signal supplied through the low-side driver I/O pin DL1-DLN is approximately an inverted version of the high-side driver signal supplied through the corresponding high-side driver I/O pin DH1-DHN. Therefore, in a discrete power MOSFET application incorporating the illustrated embodiment of FIG. 5, the XNOR gate 220 preferably produces an inverted PWM signal based on the PWM signal at PWM. To do so, the output received by the XNOR gate 220 from the latched voltage detector 222 preferably has an appropriate value (e.g. logic 0) to cause the output of the XNOR gate 220 to be the invert of the other input, i.e. the PWM signal at PWM.

On the other hand, in a DrMOS-based application, there is no need to invert the low-side driver signal supplied through the low-side driver I/O pin DL1-DLN. Instead, it is preferable for the low-side driver signal to be based directly on the PWM signal at PWM. In this case, therefore, the low-side driver signal supplied at the low-side MOSFET driver signal node DL is approximately the same (with respect to period and duty cycle) as the PWM signal at PWM, but with some delay due to the intervening components. To achieve this result, the output received by the XNOR gate 220 from the latched voltage detector 222 preferably has an appropriate value (e.g. logic 1) to cause the output of the XNOR gate 220 to be approximately the same as the other input, i.e. the PWM signal at PWM, but with a slight delay due to the XNOR gate 220.

In other words, depending on the value of the output of the latched voltage detector 222, the XNOR gate 220 produces either an inverted or a non-inverted PWM signal at its output based on the initial PWM signal at PWM. (It is appreciated that circuits or components, other than the XNOR gate, can be used to produce a result where the incoming signal is either inverted or not. Thus, the scope of the present invention also extends to these other circuits or components.) In an embodiment as shown in FIG. 5, therefore, the output of the latched voltage detector 222 determines the characteristics of the low-side driver signal supplied at the low-side MOSFET driver signal node DL and out through the low-side driver I/O pin DL1-DLN (FIGS. 3 and 4). The inputs to the latched voltage detector 222, therefore, serve as an "application signal" indicating whether the power controller 142 has been incorporated into a discrete power MOSFET application (e.g. FIG. 3) or into a DrMOS-based application (e.g. FIG. 4). Additionally, the latched voltage detector 222 serves as a sensor for detecting the application signal and producing an output value (e.g. logic 0 or 1) that controls part of the functioning of the output circuit 202 (e.g. 164-168, FIGS. 3 and 4).

According to this embodiment, the latched voltage detector 222 preferably latches its input condition when it receives the start signal at "Start". Additionally, the inputs to the latched voltage detector 222, which serve as the "application signal", preferably include the input voltage Vin and the voltage at the switch node drive signal node SW. In a DrMOS-based application, the switch node drive signal node SW is preferably connected through the switch node drive I/O pin SW1-SWN of the power controller 142 to Vin3, as shown in FIG. 4. Therefore, when the voltage received from the switch node drive signal node SW is about the same as the input voltage Vin, not only is the high-side pre-driver 204 effectively turned off (see above), but the latched voltage detector 222 preferably produces the appropriate value (e.g. logic 1) for the given application, as mentioned above. In a discrete power MOSFET application, on the other hand, the switch node drive signal node SW is connected through the switch node drive I/O pin SW1-SWN of the power controller 142 to the switch node 180 in the discrete power MOSFET power chain 146-150, as shown in FIG. 3. Therefore, since the discrete power MOSFET power chain 146-150 maintains the switch node 180 well below the input voltage Vin, when the latched voltage detector 222 detects that the voltage at the switch node drive signal node SW is different from (e.g. less than) the input voltage Vin, the latched voltage detector 222 preferably produces the appropriate value (e.g. logic 0) for the given application, as mentioned above.

The logic threshold and action of the latched voltage detector 222 can be tailored to suit the needs of an individual application. In processor $V_{CORE}$ applications, for example, where the output voltage is never supposed to be above 2V (else, the processor is damaged), a logic threshold greater than 2V can be used. In other applications, on the other hand, where a converter has to start into a high voltage (pre-biased start-up), the logic threshold can be up to the greater of different available input voltages.

Figure 6:
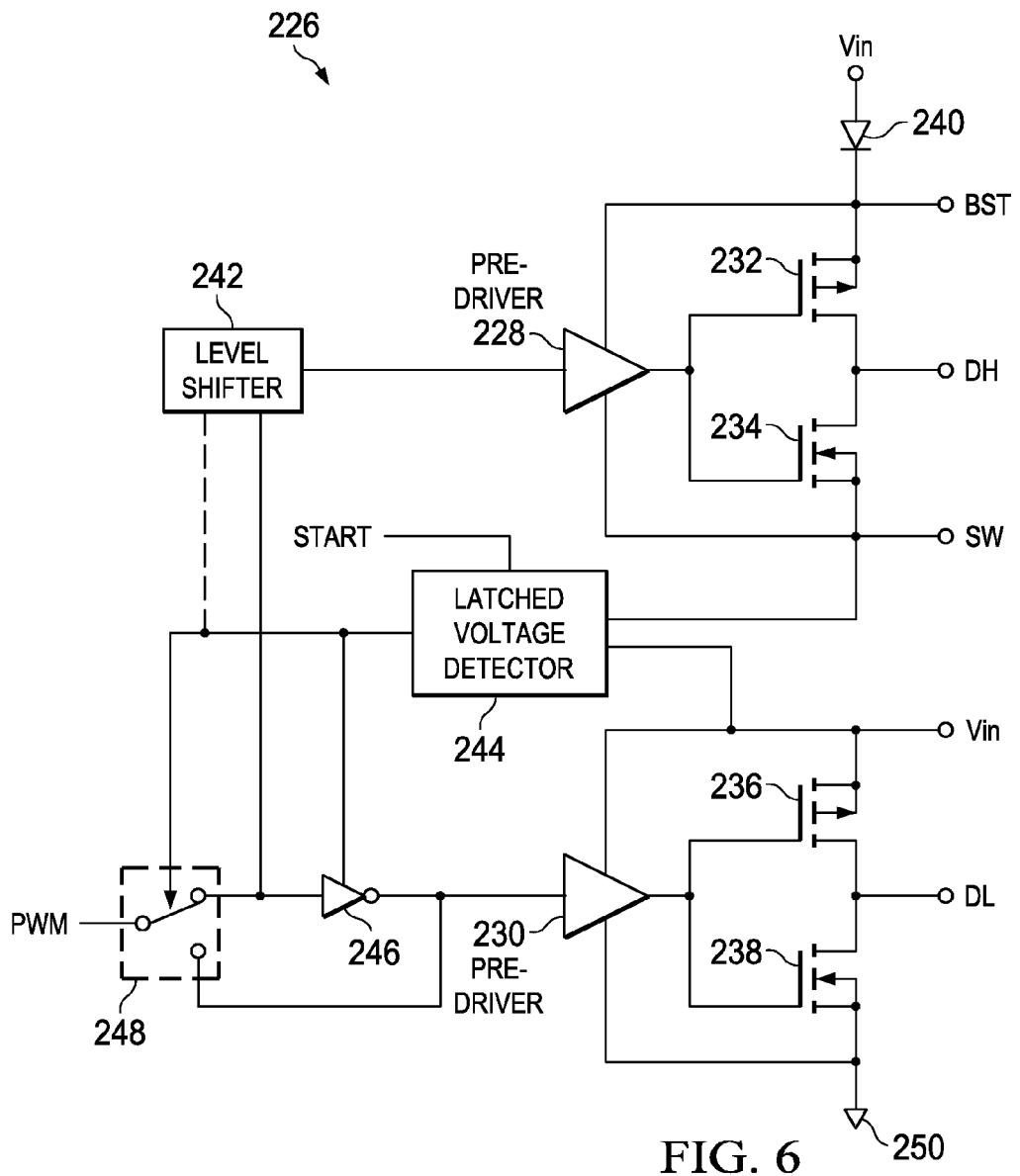
FIG. 6 is a simplified schematic diagram of another output circuit for use in the power controller shown in FIGS. 3 and 4, according to an alternative embodiment of the present invention.

A second example for an embodiment for an output circuit 226 (e.g. the one or more output circuits 164, 166 and 168) that can be used in the drivers 162 of the power controller 142 is shown in FIG. 6. According to this embodiment, the output circuit 226 generally includes a high-side pre-driver 228, a low-side pre-driver 230, high-side P-channel and N-channel drive MOSFETs 232 and 234, low-side P-channel and N-channel drive MOSFETs 236 and 238, a diode 240, a level shifter 242, a latched voltage detector 244, an inverter 246 and a 2-way switch 248. Also according to this embodiment, the output circuit 226 is generally connected to an appropriate input voltage Vin, ground at 250 and the PWM signal 184 (from the PWM generator 160, FIGS. 3 and 4) at "PWM". Furthermore, the switch node drive signal node SW generally connects to the corresponding one of the switch node drive I/O pins SW1-SWN (FIGS. 3 and 4). The bootstrap drive signal node BST generally connects to the corresponding one of the bootstrap drive I/O pins BST1-BSTN. The high-side MOSFET driver signal node DH generally connects to the corresponding one of the high-side driver I/O pins DH1-DHN. The low-side MOSFET driver signal node DL generally connects to the corresponding one of the low-side driver I/O pins DL1-DLN. Other components and connections may be included, but are not shown for simplicity.

The diode 240 and the high-side drive MOSFETs 232 and 234 are connected in series between the input voltage Vin and the switch node drive signal node SW as shown. The bootstrap drive signal node BST connects between the diode 240 and a source of the high-side P-channel drive MOSFET 232. The high-side MOSFET driver signal node DH connects between drains of the high-side drive MOSFETs 232 and 234. Gates of the high-side drive MOSFETs 232 and 234 are connected to an output of the high-side pre-driver 228. Also connected to the high-side pre-driver 228 are the bootstrap drive signal node BST, the switch node drive signal node SW and an output of the level shifter 242. An input of the level shifter 242 is preferably connected between a first output of the switch 248 and an input of the inverter 246. The level shifter 242 optionally receives an output of the latched voltage detector 244.

The low-side drive MOSFETs 236 and 238 are connected in series between the input voltage Vin and the ground at 250 as shown. Additionally, the low-side MOSFET driver signal node DL connects between drains of the low-side drive MOSFETs 236 and 238. Gates of the low-side drive MOSFETs 236 and 238 are connected to an output of the low-side pre-driver 230. Also connected to the low-side pre-driver 230 are the input voltage Vin, the ground at 250 and an output of the inverter 246. An input of the inverter 246 connects to the first output of the switch 248. The inverter 246 also preferably receives the output of the latched voltage detector 244. A second output of the switch 248 bypasses the inverter 246 and the connection to the level shifter 242 and connects between the output of the inverter 246 and the input of the low-side pre-driver 230. An input of the switch 248 connects to the PWM signal at PWM. The latched voltage detector 244 is connected to the input voltage Vin and to the switch node drive signal node SW. The latched voltage detector 244 also preferably receives a start signal at "Start". The output of the latched voltage detector 244 is connected to a control input of the switch 248.

In a discrete power MOSFET application (e.g. FIG. 3) incorporating the illustrated embodiment of FIG. 6, the switch 248 is set by the output of the latched voltage detector 244 to connect the PWM signal at PWM to the input of the level shifter 242 (and to the input of the inverter 246). The level shifter 242, thus, produces a level shifted PWM signal at its output based on the initial PWM signal at PWM received through the switch 248. Additionally, the switch node drive signal node SW is connected through the switch node drive I/O pin SW1-SWN of the power controller 142 to the switch node 180 between the discrete power MOSFETs 170 and 172. Therefore, since the bootstrap drive signal node BST is connected through the forward biased diode 240 to the input voltage Vin, there is a voltage potential between the bootstrap drive signal node BST and the switch node drive signal node SW. This voltage potential powers the high-side pre-driver 228 in this situation, so the high-side pre-driver 228 produces a high-side pre-drive signal, which is based on the level shifted PWM signal output from the level shifter 242. The high-side pre-drive signal is supplied to the gates of the high-side drive MOSFETs 232 and 234 to cause the high-side drive MOSFETs 232 and 234 to produce the high-side driver signal at the high-side MOSFET driver signal node DH. The high-side driver signal is, thus, supplied through the corresponding high-side driver I/O pin DH1-DHN of the power controller 142 to the high-side discrete power MOSFET 170 in this example situation.

On the other hand, in a DrMOS-based application (e.g. FIG. 4) incorporating the illustrated embodiment of FIG. 6, the switch 248 is set by the output of the latched voltage detector 244 to bypass the connection to the input of the level shifter 242 (and the inverter 246). The level shifter 242, thus, does not receive the PWM signal, so the level shifter 242 does not produce the level shifted PWM signal. Instead, the level shifter 242 is effectively turned off (optionally turned off by the output signal from the latched voltage detector 244), thereby conserving power. Additionally, the switch node drive signal node SW is connected through the switch node drive I/O pin SW1-SWN of the power controller 142 to the input voltage Vin3. Therefore, since the bootstrap drive signal node BST is connected through the forward biased diode 240 to the input voltage Vin, there is almost no voltage potential (if the voltage level of Vin equals the voltage level of Vin3)

between the bootstrap drive signal node BST and the switch node drive signal node SW. The high-side pre-driver 228 is, thus, effectively turned off, thereby conserving power. The high-side pre-driver 228, thus, does not produce the high-side pre-drive signal, so the high-side drive MOSFETs 232 and 234 do not produce the high-side driver signal at the high-side MOSFET driver signal node DH in this situation.

In both a discrete power MOSFET application (e.g. FIG. 3) and a DrMOS-based application (e.g. FIG. 4) incorporating the illustrated embodiment of FIG. 6, the low-side pre-driver 230 is powered by a voltage potential between the input voltage Vin and the ground at 250. The low-side pre-driver 230 produces a low-side pre-drive signal based on a signal output from either the inverter 246 or the switch 248, depending on the setting of the switch 248. The low-side pre-drive signal is supplied to the gates of the low-side drive MOSFETs 236 and 238 to cause the low-side drive MOSFETs 236 and 238 to produce the low-side driver signal at the low-side MOSFET driver signal node DL.

In a discrete power MOSFET application (e.g. FIG. 3), the low-side driver signal is supplied through the corresponding low-side driver I/O pin DL1-DLN of the power controller 142 to the low-side discrete power MOSFET 172 in this example situation. On the other hand, in a DrMOS-based application (e.g. FIG. 4), the low-side driver signal is supplied through the corresponding low-side driver I/O pin DL1-DLN of the power controller 142 to the PWM Input of one of the DrMOS ICs DrMOS1-DrMOSN.

In a discrete power MOSFET application, the low-side driver signal supplied through the low-side driver I/O pin DL1-DLN is approximately an inverted version of the high-side driver signal supplied through the corresponding high-side driver I/O pin DH1-DHN. Therefore, in a discrete power MOSFET application incorporating the illustrated embodiment of FIG. 6, the inverter 246 (preferably enabled by the output of the latched voltage detector 270) produces an inverted PWM signal based on the PWM signal at PWM received through the switch 248. To do so, the output from the latched voltage detector 244 preferably has an appropriate value to cause the switch 248 to connect the PWM signal at PWM to the inverter 246 (and to the level shifter 242).

On the other hand, in a DrMOS-based application, there is no need to invert the low-side driver signal supplied through the low-side driver I/O pin DL1-DLN. Instead, it is preferable for the low-side driver signal to be based directly on the PWM signal at PWM. In this case, therefore, the low-side driver signal supplied at the low-side MOSFET driver signal node DL is approximately the same (with respect to period and duty cycle) as the PWM signal at PWM, but with some delay due to the intervening components. To achieve this result, the output received by the switch 248 from the latched voltage detector 244 preferably has an appropriate value to cause the switch 248 to connect the PWM signal at PWM to the input of the low-side pre-driver 230, thereby bypassing the inverter 246 and the connection to the level shifter 242. Additionally, the output from the latched voltage detector 244 preferably disables the inverter 246 to prevent the inverter 246 from affecting the PWM signal input to the low-side pre-driver 230.

In other words, as in the embodiment shown in FIG. 5, depending on the value of the output of the latched voltage detector 244, the low-side pre-driver receives either an inverted or a non-inverted PWM signal at its input based on the initial PWM signal at PWM. In an embodiment as shown in FIG. 6, therefore, the output of the latched voltage detector 244 determines the characteristics of the low-side driver signal supplied at the low-side MOSFET driver signal node DL and out through the low-side driver I/O pin DL1-DLN (FIGS. 3 and 4). The inputs to the latched voltage detector 244, therefore, serve as an "application signal" indicating whether the power controller 142 has been incorporated into a discrete power MOSFET application (e.g. FIG. 3) or into a DrMOS-based application (e.g. FIG. 4). Additionally, the latched voltage detector 244 serves as a sensor for detecting the application signal and producing an output value (e.g. logic 0 or 1) that controls part of the functioning of the output circuit 226 (e.g. 164-168, FIGS. 3 and 4).

According to this embodiment, and similar to the embodiment of FIG. 5, the latched voltage detector 244 preferably latches its input condition when it receives the start signal at "Start". Additionally, the inputs to the latched voltage detector 244, which serve as the "application signal", preferably include the input voltage Vin and the voltage at the switch node drive signal node SW. In a DrMOS-based application, the switch node drive signal node SW is preferably connected through the switch node drive I/O pin SW1-SWN of the power controller 142 to Vin3, as shown in FIG. 4. Therefore, when the voltage received from the switch node drive signal node SW is about the same as the input voltage Vin, not only is the high-side pre-driver 228 effectively turned off (see above), but the latched voltage detector 244 preferably produces the appropriate value (e.g. logic 0 or 1) to set the switch 248 for the given application, disable the inverter 246 and optionally disable the level shifter 242, as mentioned above. In a discrete power MOSFET application, on the other hand, the switch node drive signal node SW is connected through the switch node drive I/O pin SW1-SWN of the power controller 142 to the switch node 180 in the discrete power MOSFET power chain 146-150, as shown in FIG. 3. Therefore, since the discrete power MOSFET power chain 146-150 maintains the switch node 180 well below the input voltage Vin, when the latched voltage detector 244 detects that the voltage at the switch node drive signal node SW is different from (e.g. less than) the input voltage Vin, the latched voltage detector 244 preferably produces the appropriate value (e.g. logic 1 or 0) to set the switch 248 for the given application, enable the inverter 246 and optionally enable the level shifter 242, as mentioned above.

Since the PWM signal, in a DrMOS-based application incorporating an embodiment as shown in FIG. 6, is routed almost directly to the low-side pre-driver 230, there is slightly less delay than there is for an embodiment as shown in FIG. 5. Additionally, bypassing and disabling the inverter 246 and the level shifter 242 generally results in less overall power consumption with a DrMOS-based application incorporating an embodiment as shown in FIG. 6 than for a DrMOS-based application incorporating an embodiment as shown in FIG. 5, since the XNOR gate 220 and level shifter 218 of FIG. 5 are not bypassed, but are still active. In fact, the XNOR gate 220 must be active. However, the level shifter 218 may alternatively be deactivated (e.g. using the output of the latched voltage detector 222) in such an application.

An advantage of an embodiment as shown in FIG. 5 compared to an embodiment as shown in FIG. 6 is the potential to use fewer components, thereby saving space in an IC for the power controller 142. In particular, the XNOR gate 220 potentially takes less space than the inverter 246 and the switch 248.

Figure 7:
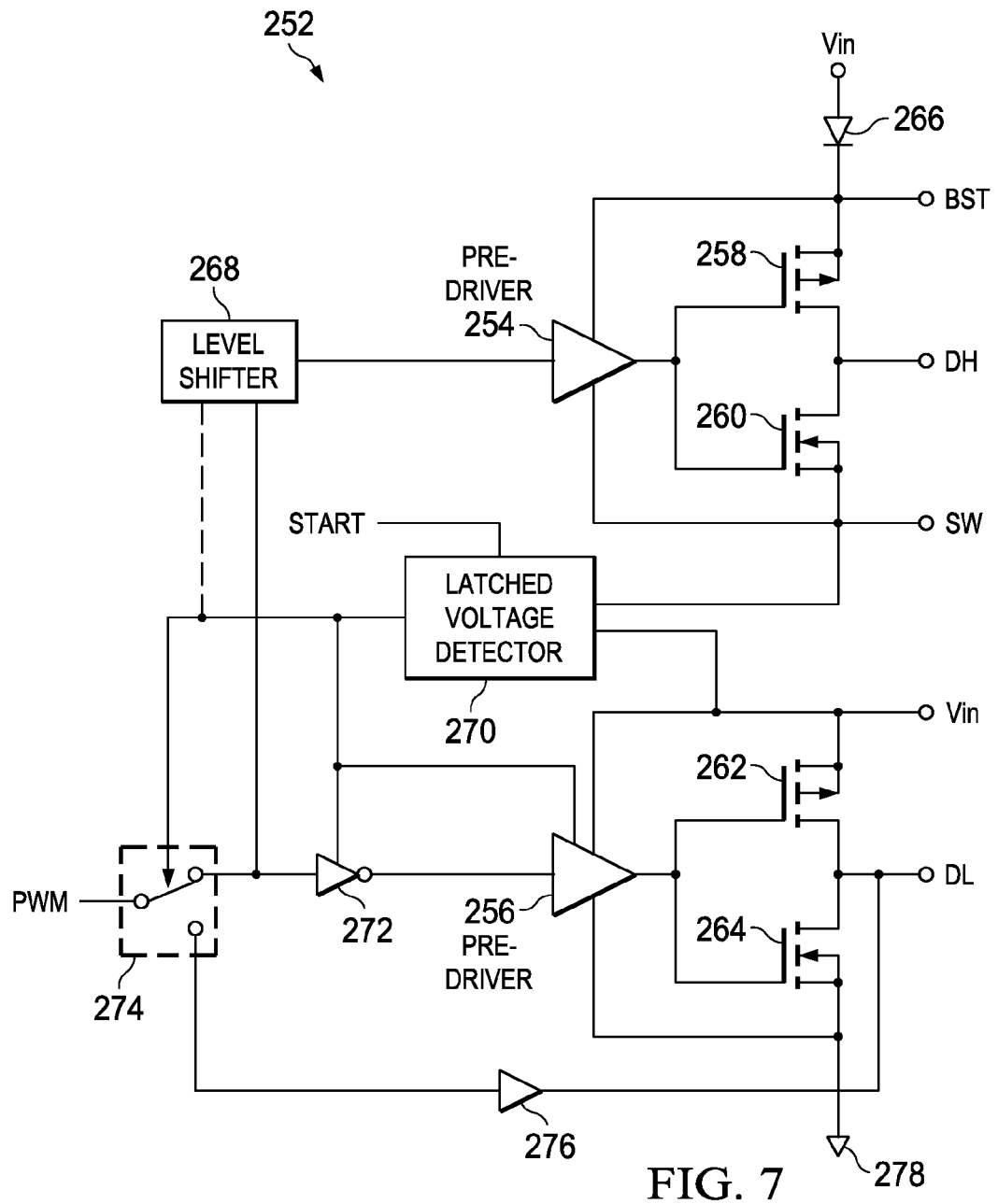
FIG. 7 is a simplified schematic diagram of yet another output circuit for use in the power controller shown in FIGS. 3 and 4, according to another alternative embodiment of the present invention.

A third example for an embodiment for an output circuit 252 (e.g. the one or more output circuits 164, 166 and 168) that can be used in the drivers 162 of the power controller 142 is shown in FIG. 7. According to this embodiment, the output circuit 252 generally includes a high-side pre-driver 254, a low-side pre-driver 256, high-side P-channel and N-channel drive MOSFETs 258 and 260, low-side P-channel and N-channel drive MOSFETs 262 and 264, a diode 266, a level shifter 268, a latched voltage detector 270, an inverter 272, a 2-way switch 274 and a buffer 276. Also according to this embodiment, the output circuit 252 is generally connected to an appropriate input voltage Vin, ground at 278 and the PWM signal 184 (from the PWM generator 160, FIGS. 3 and 4) at "PWM". Furthermore, the switch node drive signal node SW generally connects to the corresponding one of the switch node drive I/O pins SW1-SWN (FIGS. 3 and 4). The bootstrap drive signal node BST generally connects to the corresponding one of the bootstrap drive I/O pins BST1-BSTN. The high-side MOSFET driver signal node DH generally connects to the corresponding one of the high-side driver I/O pins DH1-DHN. The low-side MOSFET driver signal node DL generally connects to the corresponding one of the low-side driver I/O pins DL1-DLN. Other components and connections may be included, but are not shown for simplicity.

The diode 266 and the high-side drive MOSFETs 258 and 260 are connected in series between the input voltage Vin and the switch node drive signal node SW as shown. The bootstrap drive signal node BST connects between the diode 266 and a source of the high-side P-channel drive MOSFET 258. The high-side MOSFET driver signal node DH connects between drains of the high-side drive MOSFETs 258 and 260. Gates of the high-side drive MOSFETs 258 and 260 are connected to an output of the high-side pre-driver 254. Also connected to the high-side pre-driver 254 are the bootstrap drive signal node BST, the switch node drive signal node SW and an output of the level shifter 268. An input of the level shifter 268 is preferably connected between a first output of the switch 274 and an input of the inverter 272. The level shifter 268 optionally receives an output of the latched voltage detector 270.

The low-side drive MOSFETs 262 and 264 are connected in series between the input voltage Vin and the ground at 278 as shown. Additionally, the low-side MOSFET driver signal node DL connects between drains of the low-side drive MOSFETs 262 and 264. Gates of the low-side drive MOSFETs 262 and 264 are connected to an output of the low-side pre-driver 256. Also connected to the low-side pre-driver 256 are the input voltage Vin, the ground at 278, an output of the inverter 272 and the output of the latched voltage detector 270. An input of the inverter 272 connects to the first output of the switch 274. The inverter 272 also preferably receives the output of the latched voltage detector 270. A second output of the switch 274 connects through the buffer 276 to the low-side MOSFET driver signal node DL, bypassing the inverter 272, the connection to the level shifter 268, the low-side pre-driver 256 and the low-side drive MOSFETs 262 and 264. An input of the switch 274 connects to the PWM signal at PWM. The latched voltage detector 270 is connected to the input voltage Vin and to the switch node drive signal node SW. The latched voltage detector 270 also preferably receives a start signal at "Start". The output of the latched voltage detector 270 is connected to a control input of the switch 274.

In a discrete power MOSFET application (e.g. FIG. 3) incorporating the illustrated embodiment of FIG. 7, the switch 274 is set by the output of the latched voltage detector 270 to connect the PWM signal at PWM to the input of the level shifter 268 (and to the input of the inverter 272). The level shifter 268, thus, produces a level shifted PWM signal at its output based on the initial PWM signal at PWM received through the switch 274. Additionally, the switch node drive signal node SW is connected through the switch node drive I/O pin SW1-SWN of the power controller 142 to the switch node 180 between the discrete power MOSFETs 170 and 172. Therefore, since the bootstrap drive signal node BST is connected through the forward biased diode 266 to the input voltage Vin, there is a voltage potential between the bootstrap drive signal node BST and the switch node drive signal node SW. This voltage potential powers the high-side pre-driver 254 in this situation, so the high-side pre-driver 254 produces a high-side pre-drive signal, which is based on the level shifted PWM signal output from the level shifter 268. The high-side pre-drive signal is supplied to the gates of the high-side drive MOSFETs 258 and 260 to cause the high-side drive MOSFETs 258 and 260 to produce the high-side driver signal at the high-side MOSFET driver signal node DH. The high-side driver signal is, thus, supplied through the corresponding high-side driver I/O pin DH1-DHN of the power controller 142 to the high-side discrete power MOSFET 170 in this example situation.

On the other hand, in a DrMOS-based application (e.g. FIG. 4) incorporating the illustrated embodiment of FIG. 7, the switch 274 is set by the output of the latched voltage detector 270 to bypass the connection to the input of the level shifter 268 (and the inverter 272, the low-side pre-driver 256 and the low-side drive MOSFETs 262 and 264). The level shifter 268, thus, does not receive the PWM signal, so the level shifter 268 does not produce the level shifted PWM signal. Instead, the level shifter 268 is effectively turned off (optionally turned off by the output signal from the latched voltage detector 270), thereby conserving power. Additionally, the switch node drive signal node SW is connected through the switch node drive I/O pin SW1-SWN of the power controller 142 to the input voltage Vin3. Therefore, since the bootstrap drive signal node BST is connected through the forward biased diode 266 to the input voltage Vin, there is almost no voltage potential (if the voltage level of Vin equals the voltage level of Vin3) between the bootstrap drive signal node BST and the switch node drive signal node SW. The high-side pre-driver 254 is, thus, effectively turned off, thereby conserving power. The high-side pre-driver 254, thus, does not produce the high-side pre-drive signal, so the high-side drive MOSFETs 258 and 260 do not produce the high-side driver signal at the high-side MOSFET driver signal node DH in this situation.

In a discrete power MOSFET application (e.g. FIG. 3) incorporating the illustrated embodiment of FIG. 7, the switch 274 is set by the output of the latched voltage detector 270 to connect the PWM signal at PWM to the input of the inverter 272 (as well as to the input of the level shifter 268). The inverter 272 (preferably enabled by the output of the latched voltage detector 270) generates an inverted PWM signal based on the initial PWM signal received through the switch 274. Powered by a voltage potential between the input voltage Vin and the ground at 278, the low-side pre-driver 256 (also preferably enabled by the output of the latched voltage detector 270) produces a low-side pre-drive signal based on the inverted PWM signal from the inverter 272. The low-side pre-drive signal is supplied to the gates of the low-side drive MOSFETs 262 and 264 to cause the low-side drive MOSFETs 262 and 264 to produce the low-side driver signal at the low-side MOSFET driver signal node DL. The low-side driver signal is, thus, supplied through the corresponding low-side driver I/O pin DL1-DLN of the power controller 142 to the low-side discrete power MOSFET 172 in this example situation.

In a DrMOS-based application (e.g. FIG. 4) incorporating the illustrated embodiment of FIG. 7, the switch 274 is set by the output of the latched voltage detector 270 to connect the PWM signal at PWM through the buffer 276 to the low-side MOSFET driver signal node DL, thereby bypassing the inverter 272, the low-side pre-driver 256 and the low-side drive MOSFETs 262 and 264. Additionally, the output of the latched voltage detector 270 disables the inverter 272 and the low-side pre-driver 256 (e.g. tristates the low-side pre-driver 256) in order to prevent stray signals from the inverter 272 and the low-side pre-driver 256 from causing the low-side drive MOSFETs 262 and 264 to interfere with the PWM signal produced by the buffer 276 at the low-side MOSFET driver signal node DL. The PWM signal is, thus, supplied through the corresponding low-side driver I/O pin DL1-DLN of the power controller 142 to the PWM Input of one of the DrMOS ICs DrMOS1-DrMOSN.

Similar to the embodiments illustrated in FIGS. 5 and 6, the inputs to the latched voltage detector 270 serve as an "application signal" indicating whether the power controller 142 has been incorporated into a discrete power MOSFET application (e.g. FIG. 3) or into a DrMOS-based application (e.g. FIG. 4). Additionally, the latched voltage detector 270 serves as a sensor for detecting the application signal and producing an output value (e.g. logic 0 or 1) that controls part of the functioning of the output circuit 252 (e.g. 164-168, FIGS. 3 and 4).

According to this embodiment, and similar to the embodiments of FIGS. 5 and 6, the latched voltage detector 270 preferably latches its input condition when it receives the start signal at "Start". Additionally, the inputs to the latched voltage detector 270, which serve as the "application signal", preferably include the input voltage Vin and the voltage at the switch node drive signal node SW. In a DrMOS-based application, the switch node drive signal node SW is preferably connected through the switch node drive I/O pin SW1-SWN of the power controller 142 to Vin3, as shown in FIG. 4. Therefore, when the voltage received from the switch node drive signal node SW is about the same as the input voltage Vin, not only is the high-side pre-driver 254 effectively turned off (see above), but the latched voltage detector 270 preferably produces the appropriate value (e.g. logic 0 or 1) to set the switch 274 for the given application, disable the inverter 272 and the low-side pre-driver 256 and optionally disable the level shifter 268, as mentioned above. In a discrete power MOSFET application, on the other hand, the switch node drive signal node SW is connected through the switch node drive I/O pin SW1-SWN of the power controller 142 to the switch node 180 in the discrete power MOSFET power chain 146-150, as shown in FIG. 3. Therefore, since the discrete power MOSFET power chain 146-150 maintains the switch node 180 well below the input voltage Vin, when the latched voltage detector 270 detects that the voltage at the switch node drive signal node SW is different from (e.g. less than) the input voltage Vin, the latched voltage detector 270 preferably produces the appropriate value (e.g. logic 1 or 0) to set the switch 274 for the given application, enable the inverter 272 and the low-side pre-driver 256 and optionally enable the level shifter 268, as mentioned above.

Unlike the embodiments of FIGS. 5 and 6, the embodiment of FIG. 7 does not use the low-side pre-driver 256 or the low-side drive MOSFETs 262 and 264 to generate the PWM signal in a DrMOS-based application. Therefore, the embodiment of FIG. 7 produces the PWM signal with less delay than in the embodiments of FIGS. 5 and 6. Additionally, the low-side pre-driver 206 or 230 and the low-side drive MOSFETs 212/214 or 236/238 of FIGS. 5 and 6 generate the PWM signal in a DrMOS-based application with considerably more current than is generally required to drive the PWM inputs of the DrMOS ICs DrMOS1-DrMOSN (FIG. 4). Therefore, the embodiment of FIG. 7 may be more efficient than the embodiments of FIGS. 5 and 6 in a DrMOS-based application, since the PWM signal produced by the buffer 276 can be better customized to the requirements of the DrMOS standards. However, the embodiments of FIGS. 5 and 6 generally have fewer components than the embodiment of FIG. 7. Therefore, the selection of which embodiment to use in any given situation may depend on whatever tradeoffs are appropriate in that situation.

Furthermore, although all of the illustrated embodiments of FIGS. 5, 6 and 7 produce the PWM signal at the low-side MOSFET driver signal node DL in a DrMOS-based application, it is understood that the present invention is not necessarily so limited. For example, the PWM signal in a DrMOS-based application could be produced at the high-side MOSFET driver signal node DH, e.g. by using an existing high-side pre-driver and high-side drive MOSFETs or by bypassing these components with a buffer between the PWM input at PWM and the high-side MOSFET driver signal node DH. Additionally, a different combination of inputs to a sensor (similar to the latched voltage detector 222, 244 or 270) could serve as the "application signal" if necessary. Other embodiments may use other nodes of the power controller 142 to produce the PWM signal in a DrMOS-based application or to receive the application signal indicating which type of application the power controller 142 is in.

Presently preferred embodiments of the present invention and its improvements have been described with a degree of particularity. This description has been made by way of preferred example. It should be understood, however, that the scope of the claimed subject matter is defined by the following claims, and should not be unnecessarily limited by the detailed description of the preferred embodiments set forth above.

The invention claimed is:

1. A controller for controlling a power chain in an electronic device, comprising:
   a sensor that detects an application signal indicating whether the controller is in a first application requiring the controller to produce drive signals for driving discrete power MOSFETs, or a second application requiring the controller to produce an output PWM signal to control an integrated circuit having power MOSFETs integrated with MOSFET drivers;
   a first output, which produces a first drive signal and is for connecting to a first power MOSFET, when the controller is in the first application; and
   a second output, which produces a second drive signal and is for connecting to a second power MOSFET, when the controller is in the first application, and which produces the output PWM signal and is for connecting to a PWM input of the integrated circuit, when the controller is in the second application.

2. The controller of claim 1 wherein:
   the second output produces the second drive signal as a result of a power MOSFET drive function, when the controller is in the first application; and
   the controller bypasses the power MOSFET drive function in the production of the output PWM signal, when the controller is in the second application.

3. The controller of claim 1 wherein:
   the output PWM signal is produced directly from an initial PWM signal, when the controller is in the second application.

4. The controller of claim 1 further comprising:
   a PWM generator that produces an initial PWM signal; and wherein:

the first output produces the first drive signal based on the initial PWM signal, when the controller is in the first application;

the second output produces the second drive signal based on an inversion of the initial PWM signal, when the controller is in the first application; and the output PWM signal produced by the second output is based on the initial PWM signal, when the controller is in the second application.

5. The controller of claim 4 further comprising:

a pre-driver responsible, at least in part, for producing the second drive signal when the controller is in the first application and producing the output PWM signal when the controller is in the second application.

6. The controller of claim 5 further comprising:

an XNOR gate that receives the initial PWM signal and an output of the sensor and that produces an intermediate PWM signal, which is supplied to the pre-driver;

and wherein:

the intermediate PWM signal is based on the inversion of the initial PWM signal, when the controller is in the first application; and the intermediate PWM signal is based on the initial PWM signal, when the controller is in the second application.

7. The controller of claim 4 further comprising:

an inverter that receives and inverts the initial PWM signal in the production of the second drive signal, when the controller is in the first application; and a bypass circuitry that causes the initial PWM signal to bypass the inverter in the production of the output PWM signal, when the controller is in the second application.

8. The controller of claim 4 further comprising:

a pre-driver;

drive MOSFETs operated by the pre-driver to produce the second drive signal, when the controller is in the first application; and a driver bypass circuitry that causes the initial PWM signal to bypass the pre-driver and the drive MOSFETs and that is responsible, at least in part, for producing the output PWM signal, when the controller is in the second application.

9. The controller of claim 4 further comprising:

a level shifter that receives and shifts the initial PWM signal in the production of the first drive signal, when the controller is in the first application; and a bypass circuitry that causes the initial PWM signal to bypass the level shifter in the production of the output PWM signal, when the controller is in the second application.

10. A controller for controlling a power chain in an electronic device, comprising:

a means for determining whether the controller is in a first application or a second application, the first application requires production of drive signals for driving discrete power MOSFETs within the power chain, the second application requires production of an output PWM signal to control a means for integrating power MOSFETs with MOSFET drivers within the power chain;

a means for providing an initial PWM signal;

a means for producing, when the controller is in the first application, a first drive signal for driving a first discrete power MOSFET, the means for producing the first drive signal includes a means for generating a level shifted PWM signal based on the initial PWM signal, and the first drive signal is based on the level shifted PWM signal;

a means for producing, when the controller is in the first application, a second drive signal for driving a second discrete power MOSFET, the means for producing the second drive signal further comprises a means for generating an inverted PWM signal based on the initial PWM signal, and the second drive signal is based on the inverted PWM signal; and a means for causing, when the controller is in the second application, the means for producing the second drive signal to produce the output PWM signal based on the initial PWM signal.

11. The controller of claim 10 wherein:

upon receiving a signal indicating that the controller is in the first application, the means for generating the inverted PWM signal generates the inverted PWM signal;

upon receiving a signal indicating that the controller is in the second application, the means for generating the inverted PWM signal generates an intermediate PWM signal that is not inverted based on the initial PWM signal; and the means for producing the second drive signal produces the output PWM signal based on the intermediate PWM signal, when the controller is in the second application.

12. The controller of claim 10 wherein:

the means for producing the second drive signal further comprises drive MOSFETs and a means for controlling the drive MOSFETs, the means for controlling the drive MOSFETs generates a drive signal supplied to the drive MOSFETs and the drive MOSFETs generate the second drive signal when the controller is in the first application; and the means for causing the means for producing the second drive signal to produce the output PWM signal further comprises a means for bypassing the drive MOSFETs, the means for controlling the drive MOSFETs and the means for generating the inverted PWM signal when the controller is in the second application.

13. A method for controlling a power chain by a controller in an electronic device, comprising:

determining whether the controller is in a first application requiring production of drive signals for driving discrete power MOSFETs within the power chain, or the controller is in a second application requiring production of an output PWM signal to control an integrated circuit having power MOSFETs integrated with MOSFET drivers within the power chain;

upon determining that the controller is in the first application, producing a first drive signal at a first output of the controller to control a first discrete power MOSFET within the power chain, and producing a second drive signal at a second output of the controller to control a second discrete power MOSFET within the power chain; and upon determining that the controller is in the second application, producing the output PWM signal at the second output of the controller to control the integrated circuit.

14. The method of claim 13 further comprising:

producing the second drive signal as a result of a power MOSFET drive function, when the controller is in the first application; and bypassing the power MOSFET drive function in the production of the output PWM signal, when the controller is in the second application.

15. The method of claim 13 further comprising:
producing the output PWM signal directly from an initial PWM signal, when the controller is in the second application.

16. The method of claim 13 further comprising:
producing an initial PWM signal;
upon determining that the controller is in the first application, producing the first drive signal at the first output based on the initial PWM signal, and producing the second drive signal at the second output based on an inversion of the initial PWM signal; and
upon determining that the controller is in the second application, producing the output PWM signal at the second output based on the initial PWM signal.

17. The method of claim 16 further comprising:
upon determining that the controller is in the first application, producing the second drive signal at least in part by a pre-driver; and
upon determining that the controller is in the second application, producing the output PWM signal at least in part by the pre-driver.

18. The method of claim 17 further comprising:
producing an intermediate PWM signal by an XNOR gate that receives the initial PWM signal and a signal that indicates which of the first and second applications the controller is in; and
supplying the intermediate PWM signal to the pre-driver; and wherein:
the intermediate PWM signal is based on the inversion of the initial PWM signal, when the controller is in the first application; and
the intermediate PWM signal is based on the initial PWM signal, when the controller is in the second application.

19. The method of claim 16 further comprising:
upon determining that the controller is in the first application, inverting the initial PWM signal by an inverter and producing the second drive signal by drive MOSFETs that are operated by a pre-driver that is controlled by the inversion of the initial PWM signal; and
upon determining that the controller is in the second application, a driver bypass circuitry bypassing the inverter, the pre-driver and the drive MOSFETs, and the driver bypass circuitry producing the output PWM signal based on the initial PWM signal.

20. The method of claim 16 further comprising:
upon determining that the controller is in the first application, a level shifter shifting the initial PWM signal in the production of the first drive signal; and
upon determining that the controller is in the second application, the initial PWM signal bypassing the level shifter in the production of the output PWM signal.

* * * * *